United States Patent [19]

Haruta et al.

[11] 4,410,899

[45] Oct. 18, 1983

[54] METHOD FOR FORMING LIQUID DROPLETS

[75] Inventors: Masahiro Haruta, Funabashi; Yashuhiro Yano, Naka; Yohji Matsufuji, Tokyo; Tsuyoshi Eida, Chiba; Tokuya Ohta, Yokohama, all of Japan

[73] Assignee: Canon Kabushiki Kaisha, Tokyo, Japan

[21] Appl. No.: 248,309

[22] Filed: Mar. 27, 1981

[30] Foreign Application Priority Data

Apr. 1, 1980 [JP] Japan .................................. 55-43100

[51] Int. Cl.[3] .............................................. G01D 15/18

[52] U.S. Cl. .................................. 346/140 R; 346/1.1

[58] Field of Search ............................. 346/140 PD, 1

[56] References Cited

U.S. PATENT DOCUMENTS

| | | | |
|---|---|---|---|
| 4,251,824 | 2/1981 | Hara et al. | 346/140 PD |
| 4,296,421 | 10/1981 | Hara et al. | 346/140 PD |
| 4,313,124 | 1/1982 | Hara | 346/140 PD |
| 4,317,124 | 2/1982 | Shirato et al. | 346/140 PD |

*Primary Examiner*—George H. Miller, Jr.
*Attorney, Agent, or Firm*—Fitzpatrick, Cella, Harper & Scinto

[57] ABSTRACT

A liquid droplet is formed by producing and eliminating a bubble in a liquid in such a way that the liquid flow in the liquid conduit is not intercepted even when the bubble reaches the maximum volume.

5 Claims, 3 Drawing Figures

METHOD FOR FORMING LIQUID DROPLETS

BACKGROUND OF THE INVENTION

1. Field of the Invention

The present invention relates to a method for forming liquid droplets and more particularly, to a method for making a liquid to be formed into droplets.

2. Description of the Prior Art

Among various known recording methods, ink-jet recording methods have recently drawn attention since said methods are non-impact recording methods free from noise upon recording, can effect a high speed recording and can record on plain paper without any special image-fixing treatment. Heretofore, various proposals have been made for forming droplets (ink droplets) in the ink-jet recording methods. Some of them have been already commercialized and some are still under development.

In general, the ink-jet recording method is a method for recording which comprises forming droplets of a recording liquid so-called "ink" by utilizing one or more of various action principles and attaching the droplets onto a record receiving member to effect recording.

One of liquid droplet forming methods usable for such ink-jet recording method is disclosed in West German Patent application Laid-open (DOLS) No. 2843064 (corresponding to U.S. Ser. No. 948,236 filed Oct. 3, 1978), now abandoned, for continuation application Ser. No. 262,604, and divisional application Ser. No. 262,605, both filed May 11, 1981. In this ink-jet recording method, a recording liquid present in a chamber is heated to form a bubble or subjected to some other treatment to cause a state change resulting in an abrupt increase in volume and the resulting pressure serves to form liquid droplets.

It is very important for this type of liquid droplets forming method used for ink-jet recording methods to enhance the ejection response property of liquid droplets and increase and stabilize the number of liquid droplets ejected per unit time for the purpose of enhancing the reliability.

SUMMARY OF THE INVENTION

It is an object of the present invention to provide an improved method for forming a liquid droplet usable for a liquid jet process.

It is another object of the present invention to provide an improved method for forming liquid droplets usable for a liquid jet process of improved liquid droplet ejecting property, capable of giving a uniform volume of ejected liquid and of more improved stability of liquid droplet ejection.

It is a further object of the present invention to provide an improved method for forming liquid droplets usable for a liquid jet process capable of producing recorded images of high resolution and high quality stably and at high speed for a long time and continuous recording.

It is still another object of the present invention to provide an improved method for forming liquid droplet where too much retreat of the meniscus is prevented to stabilize the ejection state of liquid droplets, and where refilling of the recording liquid into the liquid chamber can be rapidly effected and thereby the ejection response property, i.e. responding to input signals rapidly and exactly, of the liquid droplet is improved.

According to the present invention, there is provided a method for forming a liquid droplet which comprises forming a bubble in a liquid and eliminating said bubble, the liquid flow in the liquid conduit being not intercepted even when the bubble reaches its maximum volume.

DESCRIPTION OF THE PREFERRED EMBODIMENTS

Figure 1A:
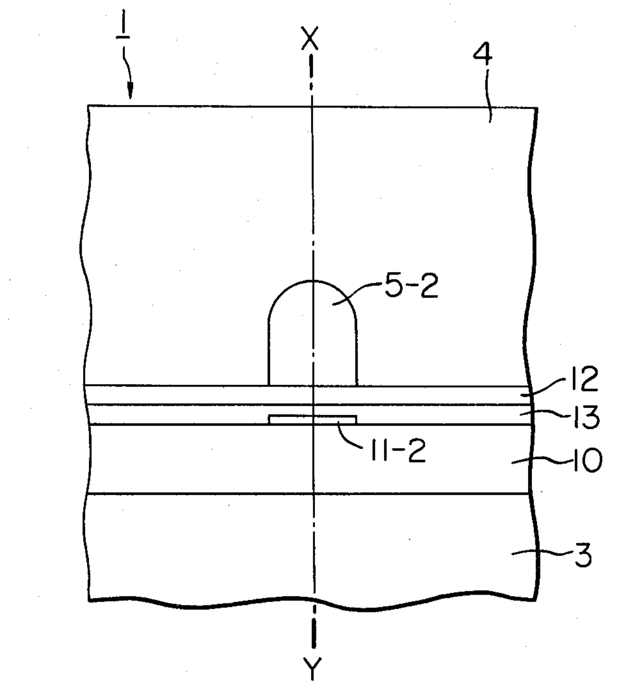
FIG. 1A is a front view of a part of an example of an apparatus effecting the process of the present invention.
Figure 1B:
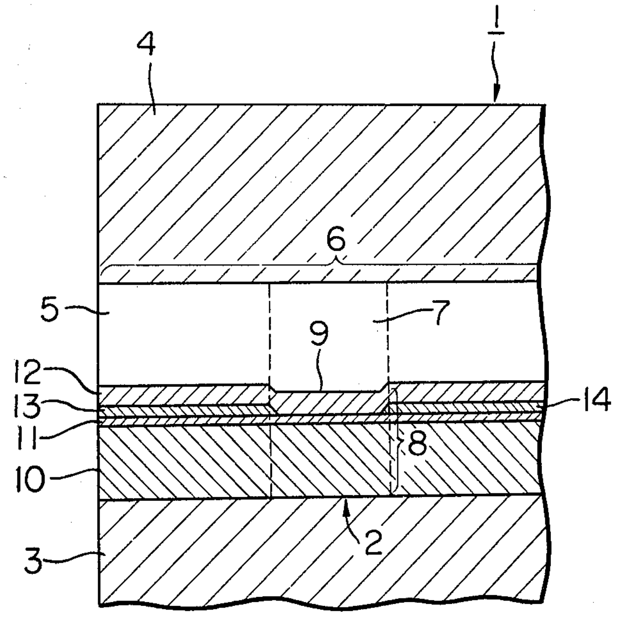
FIG. 1B is a cross sectional view taken along a dot and dash line X–Y of FIG. 1A.
Figure 2A:
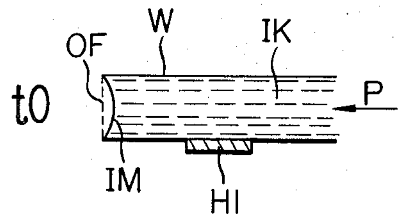
FIG. 2 shows schematically the process of the bubble formation and liquid ejection according to the present invention.
Figure 2B:
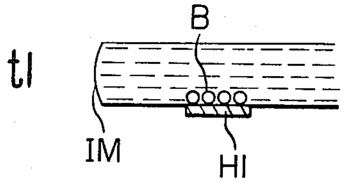
Figure 2C:
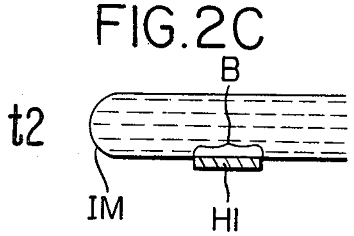
Figure 2D:
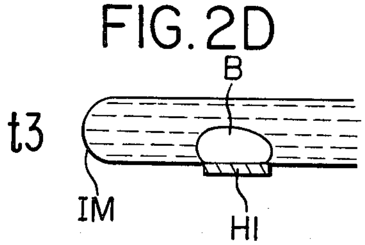
Figure 2E:
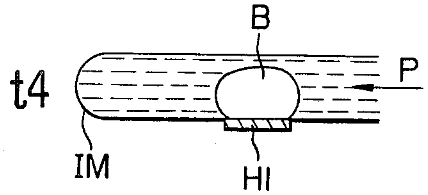
Figure 2F:
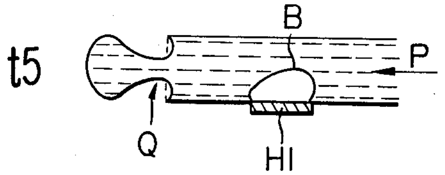
Figure 2G:
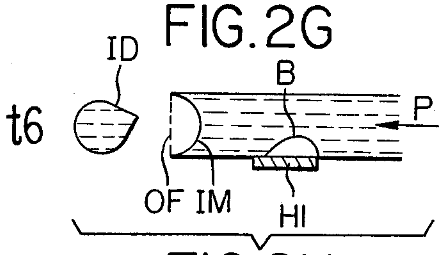
Figure 2H:
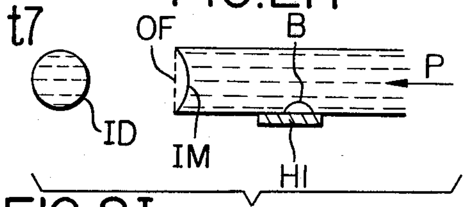
Figure 2I:
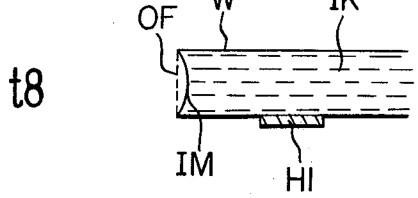

The method of the present invention may be carried out by using the apparatus as shown in FIG. 1A and FIG. 1B.

A liquid droplet ejection head 1 comprises a substrate 3 having an electrothermal transducer 2 and a grooved plate 4 having a groove of a predetermined width and a predetermined depth, the grooved plate 4 being bonded to the substrate to form an orifice 5 and a liquid ejection portion 6. In the case of the head as shown in FIG. 1, there is only one orifice 5. However, the present invention is not limited to one orifice, but can be used for a plurality of orifices, that is, so-called "multi-orifice type head".

The liquid ejection portion 6 has an orifice for ejecting a droplet at the end and a heat actuating portion 7 where heat energy generated at an electrothermal transducer 2 acts on the liquid to produce a bubble and an abrupt state change is caused by expansion and shrinkage of a volume of the bubble.

Heat actuating portion 7 is located on a heat generating portion 8 of an electrothermal transducer 2 and the bottom surface of heat actuating portion 7 is a heating surface 9 contacting the liquid of heat generating portion 8.

Heat generating portion 8 comprises a lower layer 10 disposed on substrate 3, a heat generating resistive layer 11 overlying the lower layer 10, and electrodes 13 and 14 overlying the layer 11 for applying electricity to the layer 11. Electrode 14 is disposed along the liquid conduit of the liquid ejection portion.

An upper layer 12 serves to protect the heat generating resistive layer chemically and physically from the liquid, that is, the layer 12 separates the heat generating resistive layer 11 from the liquid in the liquid ejection portion 6, and further the upper layer 12 serves to prevent electrodes 13 and 14 from shortcircuiting through the liquid.

The upper layer 12 functions as mentioned above, but where the heat generating resistive layer 11 is liquid-resistant and there is no fear that electrodes 13 and 14 shortcircuit through the liquid, it is not necessary to provide the upper layer 12, that is, the electrothermal transducer may be so designed that the liquid directly contacts the surface of the heat generating resistive layer.

The lower layer 10 mainly functions to control the heat flow amount, that is, upon ejecting a liquid droplet, the heat formed at the heat generating resistive layer 11 flows more to the heat actuating portion 7 than to the substrate 3 as far as possible while after ejecting a liquid droplet, that is, after an electric current to the heat generating resistive layer 11 is switched off, the heat present at the heat actuating portion 7 and the heat generating portion 8 is rapidly released to the substrate 3 side resulting in shrinkage of the bubble volume formed at the heat actuating portion 7.

The liquid droplet formation of the present invention is further explained in detail referring to FIG. 2. In FIG. 2, an orifice OF, an ink chamber W and a heat generating member Hl are shown, and the ink IK is fed from the direction indicated by arrow P. The interface (liquid surface) between ink IK and atmosphere is designated as IM. "B" denotes a bubble formed on the heat generating member Hl. At "t0" there is shown a state before ejection. A driving pulse is applied to Hl between "t0" and "tl". The temperature rise of Hl begins simultaneously with the application of the driving pulse. "tl" shows a state where the temperature of Hl has become higher than the vaporization temperature of the ink and small bubbles begin to form and the liquid surface IM expands from the orifice surface corresponding to the degree of pushing of the ink IK by the formed bubble B.

"t2" shows that the bubble B grows further and the liquid surface IM expands further.

"t3" shows that the driving pulse begins to descend and the temperature of Hl reaches almost the maximum point and the IM expands further.

"t4" shows that the temperature of the heat generating member begins to descend, but the volume of bubble B reaches the maximum and the Mi expands still further, and even at this state the ink flow in the ink chamber is not intercepted.

"t5" shows that the volume of bubble B begins to shrink and therefore, a part of the ink IK in the portion having a liquid surface IM expanded from the orifice OF is pulled back into the ink chamber W corresponding to the decreased volume of bubble B. As the result, a contraction is formed in the liquid surface IM in the direction of an arrow Q. "t6" shows that the shrinkage of bubble B proceeds further and the liquid droplet ID separates from the liquid surface IM. At this time, the retreat of IM is suppressed by the pressure of ink IK fed from the rear side (arrow P). "t7" shows that the liquid droplet is ejected and propelled, and bubble B shrinks further, but IM is pushed back to a portion near the orifice surface OF. "t8" shows a state that ink IK is completely fed and the state returns to the original state "t0".

In view of the foregoing, in FIG. 2, refilling of ink IK from the rear portion (arrow P) to ink chamber W begins at the point "t4" and therefore, the degree of retreat of liquid surface IM is very little, and therefore, during the stages at "t5"-"t8" the ink IK is completely fed to ink chamber W and thereby the state can rapidly return to the original state "t0".

According to the liquid droplet forming method as shown in FIG. 2, the time necessary for one cycle of liquid droplet formation is so shortened that the ejection response property of liquid droplet can be improved. In addition, according to this method, the ink meniscus does not retreat too much and therefore refilling of ink into the ink chamber is always effected so rapidly and completely that the liquid droplet can be ejected in a stable state.

The height of a bubble may be measured as shown below. Around a heater for ink jet there is provided a glass wall and an ink containing no dyestuff ("clear ink") is placed therein. The clear ink is illuminated by LED (light emitting diode) through one portion of the glass wall and the heater portion appears on a television monitor through an enlarging lens system from the opposite portion of the glass wall. Signal pulses are applied to the heater and the LED is actuated synchronously with the signal pulse to illuminate the clear ink. The lightening timing of LED (delay time) is changed little by little and thus finally the delay time is set to a point where the bubble reaches its maximum volume, and the height of the bubble appearing on the television monitor measured. The above mentioned heater and the input signal pulse condition may be set according to the working examples.

EXAMPLES 1-5

On an alumina substrate was formed an $SiO_2$ layer (lower layer) in the thickness 5 microns, by sputtering, then $HfB_2$ layer was formed in the thickness of 1000 Å as a heat generating resistive layer and finally an aluminum layer is formed in the thickness of 3000 Å as electrode. the resulting laminate was subjected to selective etching to form a heat generating resistor pattern of 50 microns×200 microns in size. Then an $SiO_2$ layer of 3500 Å thick was formed on the heat generating resistor pattern as a protective layer (upper layer) by sputtering to form an electrothermal transducer, and then a glass plate having a groove of 50 microns wide and 40 microns deep was bonded in such a way that the groove was brought in conformity with the heat generating resistor.

The orifice end surface was ground such that the distance between the orifice and the end of the heat generating resistor became 250 microns, and thus a recording head was produced.

The following ink compositions A - H were ejected from the recording head, and the results are as shown below.

The parts shown in the ink compositions are parts by weight. The driving condition of the recording head was that rectangular voltage pulse signal having apulse width of 10 μsec. and 20 V was applied at a cycle of 1 m sec.

| | | |
|---|---|---|
| Ink A | | |
| | Aizen Spilon Black GMH special (tradename, manufactured by Hodogaya Kayaku) | 5 parts |
| | Ethyl alcohol | 95 parts |
| Ink B | | |
| | Aizen Spilon Black GMH special | 5 parts |
| | Methylcarbitol | 80 parts |
| | Ethyl alcohol | 15 parts |
| Ink C | | |
| | Aizen Spilon Black GMH special | 5 parts |
| | Ethylcellosolve | 95 parts |
| Ink D | | |
| | Aizen Spilon Black GMH special | 5 parts |
| | Benzyl alcohol | 95 parts |
| Ink E | | |
| | Aizen Spilon Black GMH special | 5 parts |
| | N—methyl-2-pyrrolidone | 95 parts |
| Ink F | | |
| | Water Black 187L (tradename, manufactured by Orient Kayaku) | 5 parts |
| | Water | 95 parts |
| Ink G | | |
| | Water Black 187L | 5 parts |

-continued

| | | |
|---|---|---|
| | Diethylene glycol | 40 parts |
| | Water | 55 parts |
| Ink H | | |
| | Water Black 187L | 5 parts |
| | N—methyl-2-pyrrolidone | 30 parts |
| | Water | 65 parts |

TABLE 1

| Example No. | Ink | Maximum height of bubble (microns) | Ejection stability *1 | Ejection response property (KHz) |
|---|---|---|---|---|
| Comparison example 1 | A | 40 | Δ | 1.0 |
| Example 1 | B | 38 | O | 1.5 |
| Example 2 | C | 26 | O | 5.0 |
| Example 3 | D | 30 | O | 3.0 |
| Example 4 | E | 26 | O | 5.0 |
| Comparison example 2 | F | 40 or higher | X | 0.3 |
| Example 5 | G | 32 | O | 3.0 |
| Comparison example 3 | H | 40 | Δ | 1.5 |

*1 = Ejection stability
O Stable ejection
Δ Somewhat stable ejection
X Unstable ejection

EXAMPLES 6-10

Recording heads as used in Examples 1-5 except that the depth of the groove was 50 microns or 35 microns in place of 40 microns were employed and inks used in Examples 1-5 were ejected to investigate the ejection stability and ejection response property. The results are as shown in Table 2 below. The recording head driving condition was the same as that in Examples 1-5.

TABLE 2

| | | Groove depth: 50 microns | | Groove depth: 35 microns | |
|---|---|---|---|---|---|
| Example No. | Ink | Ejection stability | Ejection response property | Ejection stability | Ejection response property |
| Example 6 | B | O | $4.0^{KHz}$ | — | — |
| Example 7 | C | O | $6.0^{KHz}$ | O | $5.0^{KHz}$ |
| Example 8 | D | O | $5.0^{KHz}$ | O | $4.0^{KHz}$ |
| Example 9 | E | O | $6.0^{KHz}$ | O | $5.0^{KHz}$ |
| Comparison example 4 | F | X | $0.4^{KHz}$ | X | $0.2^{KHz}$ |
| Example 10 | G | O | $5.0^{KHz}$ | O | $4.0^{KHz}$ |

Ejection stability
O Stable ejection
Δ Somewhat stable ejection
X Unstable ejection As detailed above, according to the present invention, too much retreat of the meniscus is prevented to stabilize the ejection state of liquid droplets, and refilling of the recording liquid into the liquid chamber can be rapidly effected and thereby the ejection response property, i.e. responsing to input signals rapidly and exactly, of the liquid droplet is improved.

What we claim is:

1. A method for forming a liquid droplet, comprising: forming a bubble in a liquid in a fine conduit; and eliminating the bubble and ejecting a droplet of said liquid through an orifice communicating with the fine conduit by the pressure action which simultaneously results by the formation of the bubble, characterized by using as said liquid a liquid having the composition such that the liquid flow in the fine conduit is not intercepted by said bubble even when the bubble reaches its maximum volume.

2. A method according to claim 1 in which the bubble is formed by heating the liquid.

3. A method according to claim 1 in which the bubble formed in the liquid is not discharged into atmosphere.

4. A method according to claim 1, further characterized by the step of supplying replacement liquid to the conduit upon ejection of the droplet.

5. A method for forming a liquid droplet according to claim 1, wherein said liquid includes:

(A) A dye; and (B) A liquid carrier selected from the group consisting of methylcarbitol, ethylcellosolve, benzyl alcohol, methylpyrrolidone and diethylene glycol, said carrier being at least 30 parts by weight of said liquid.

* * * * *